(12) United States Patent
Miklos et al.

(10) Patent No.: US 10,124,443 B2
(45) Date of Patent: Nov. 13, 2018

(54) BRAZING AND SOLDERING ALLOY WIRES

(71) Applicant: Morgan Advanced Ceramics, Inc., Hayward, CA (US)

(72) Inventors: Mark Miklos, Lafayette, CA (US); Abdelouahab Ziani, Santa Clara, CA (US)

(73) Assignee: Morgan Advanced Ceramics, Inc., Hayward, CA (US)

( * ) Notice: Subject to any disclaimer, the term of this patent is extended or adjusted under 35 U.S.C. 154(b) by 1 day.

(21) Appl. No.: 15/119,171

(22) PCT Filed: Feb. 19, 2015

(86) PCT No.: PCT/EP2015/053486
§ 371 (c)(1),
(2) Date: Aug. 16, 2016

(87) PCT Pub. No.: WO2015/124665
PCT Pub. Date: Aug. 27, 2015

(65) Prior Publication Data
US 2017/0008130 A1    Jan. 12, 2017

Related U.S. Application Data

(60) Provisional application No. 61/942,208, filed on Feb. 20, 2014.

(51) Int. Cl.
| | |
|---|---|
| *B22F 7/08* | (2006.01) |
| *B23K 35/02* | (2006.01) |
| *B23K 35/30* | (2006.01) |
| *B22F 5/12* | (2006.01) |

(Continued)

(52) U.S. Cl.
CPC ............ *B23K 35/0227* (2013.01); *B21C 1/02* (2013.01); *B22F 3/17* (2013.01); *B22F 5/12* (2013.01);
(Continued)

(58) Field of Classification Search
CPC ...... B21C 1/02; B22F 3/17; B22F 5/12; B22F 7/08; B22F 1/0011; B22F 2998/10;
(Continued)

(56) References Cited

U.S. PATENT DOCUMENTS

| | | |
|---|---|---|
| 2,862,844 A | 12/1958 | Luedeman |
| 2,888,740 A | 6/1959 | Danis |

(Continued)

FOREIGN PATENT DOCUMENTS

| | | |
|---|---|---|
| EP | 0162555 | 11/1985 |
| EP | 1930115 | 6/2008 |

(Continued)

OTHER PUBLICATIONS

Kawano, H., Development of Composite Brazing Wire, 1977, Welding Research Supplement, Oct. 1977, 325-330. (Year: 1977).*

(Continued)

*Primary Examiner* — David Sample
*Assistant Examiner* — Elizabeth Collister
(74) *Attorney, Agent, or Firm* — Kilpatrick Townsend & Stockton LLP; Dean W. Russell; Kristin M. Crall (57) ABSTRACT

Brazing alloy wire formed from a composite comprising a sheath of at least one ductile first phase and a core comprising particles of a different composition to the sheath, in which: the sheath has an annealing temperature in degrees K the particles have a melting point at least 20% above the annealing temperature of the sheath the particles have a size distribution in which 25% by weight or less comprise particles less than 25 μm in size the particles are discrete.

29 Claims, 3 Drawing Sheets

(51) Int. Cl.
  *B23K 35/40* (2006.01)
  *C21D 7/10* (2006.01)
  *B22F 3/17* (2006.01)
  *B21C 1/02* (2006.01)
  *C22C 5/02* (2006.01)
  *C22C 19/05* (2006.01)
  *C22C 30/00* (2006.01)
  *C22F 1/10* (2006.01)
  *C22F 1/14* (2006.01)
  *B22F 1/00* (2006.01)

(52) U.S. Cl.
  CPC ............ *B22F 7/08* (2013.01); *B23K 35/0244* (2013.01); *B23K 35/0261* (2013.01); *B23K 35/0266* (2013.01); *B23K 35/304* (2013.01); *B23K 35/3013* (2013.01); *B23K 35/3033* (2013.01); *B23K 35/40* (2013.01); *B23K 35/406* (2013.01); *C21D 7/10* (2013.01); *C22C 5/02* (2013.01); *C22C 19/058* (2013.01); *C22C 30/00* (2013.01); *C22F 1/10* (2013.01); *C22F 1/14* (2013.01); *B22F 1/0011* (2013.01); *B22F 2998/10* (2013.01)

(58) Field of Classification Search
  CPC ............ B23K 35/0227; B23K 35/0244; B23K 35/0261; B23K 35/0266; B23K 35/3013; B23K 35/3033; B23K 35/304; B23K 35/40; B23K 35/406; C21D 7/10; C22C 19/058; C22C 30/00; C22C 5/02; C22F 1/10; C22F 1/14
  USPC .................. 428/558, 548, 553, 546, 559
  See application file for complete search history.

(56) References Cited

U.S. PATENT DOCUMENTS

| | | | |
|---|---|---|---|
| 3,986,899 A * | 10/1976 | Kole | B23K 35/025 148/23 |
| 4,800,131 A | 1/1989 | Marshall et al. | |
| 4,897,243 A | 1/1990 | Mizuhara | |
| 5,368,220 A | 11/1994 | Mizuhara et al. | |
| 5,781,846 A | 7/1998 | Jossick | |
| 2010/0005847 A1 | 1/2010 | Urevich | |

FOREIGN PATENT DOCUMENTS

| | | |
|---|---|---|
| GB | 1383304 | 2/1975 |
| JP | 56-126093 | 10/1981 |
| JP | 60-230904 | 11/1985 |
| JP | 62-081287 | 4/1987 |
| JP | 6226486 | 8/1994 |
| JP | 6269985 | 9/1994 |
| JP | 2005-081382 | 3/2005 |
| JP | 2005-205466 | 8/2005 |
| WO | 1986003716 | 7/1986 |
| WO | 2008079974 | 7/2008 |

OTHER PUBLICATIONS

Welding Handbook, vol. 5—Materials and Applications, Part 2 (9th Edition), Table 3.6 (Year: 2015).*
Total Materia, Effects of Composition, Processing and Structure on Properties of Copper and Copper Alloys, (May 2004), [http://www.totalmateria.com/Article98.htm (Accessed Dec. 13, 2017)] (Year: 2004).*
International Patent Application No. PCT/EP2015/053486, Search Report and Written Opinion dated May 28, 2015.
International Patent Application No. PCT/EP2015/053486, International Preliminary Report on Patentability dated Sep. 28, 2015.
Materials Development Corporation, Foils & Brazes, May 25, 2012, pp. 1-3, Medford, Massachusetts, www.materialsdevelopment.com/foils_brazes.htm.
Japan Patent Application No. 2016-552592, Office Action dated Oct. 24, 2017 (including English translation).
Europe Patent Application No. 15705027.9, Communication Under Rule 71(3) EPC (allowance) dated Jun. 13, 2017.
Europe Patent Application No. 15705027.9, EPO Communication (after allowance office action) dated Dec. 20, 2017.

* cited by examiner

BRAZING AND SOLDERING ALLOY WIRES

CROSS-REFERENCE TO RELATED APPLICATIONS

This application is the U.S. national phase of International Patent Application No. PCT/EP2015/053486, filed on Feb. 19, 2015, which application is related to and claims priority benefits from the U.S. Provisional Application No., filed on Feb. 20, 2014, entitled "BRAZING AND SOLDERING ALLOY WIRES," both of which are hereby incorporated in their entireties by this reference.

FIELD OF THE DISCLOSURE

This invention relates to wires and shapes of brazing and soldering alloys and to methods of brazing.

Brazing is a joining process in which a filler metal is heated above its melting point and distributed between two or more close-fitting parts by capillary action without melting the parts. For best results the chemical composition of the filler metal is chosen to reduce any adverse reaction with the parts to be joined. —Brazing as defined by the American Welding Society (AWS) as a process occurring above 450° C. with soldering at <450° C. The present invention encompasses both brazing and soldering applications but for economy of language the term brazing is used for both processes in the following.

BACKGROUD OF INVENTION

Brazing is performed in several different ways, for example:
  Torch brazing—where the filler metal, often in the form of a rod or wire, is applied to the joint and melted with a torch
  Braze welding—which does not rely on capillary action but simply on flow of the filler metal.
  Furnace brazing—where the filler metal is placed in or close to the joint and an assembly of parts and filler metal is placed into a furnace where the filler metal melts and flows to make the joint between the parts.
For different applications:
  different brazing temperatures apply according to the nature of the parts being joined [they must not melt at the brazing temperature];
  different chemical constituents are required to match the chemical composition of the parts [there must be no adverse reaction with the parts and chemical couples that might lead to corrosion need to be avoided or minimized]
  different physical characteristics are required [e.g. to match the coefficients of thermal expansion of the parts or, where the parts are of different material, to provide a gradation of properties across the joint]
  accordingly the range of choice of alloy to meet the needs of the materials being brazed frequently results in choosing a material of appropriate chemical composition for the brazed product; but of relatively poor handling physical characteristics for the brazing operation. In particular, wires and shapes of alloys that do not show a reasonable level of ductility can be difficult to handle in some applications, and are liable to breakage.

For example, for furnace brazing fuel nozzle components for gas turbine manufacture, filler metals are required that are ductile and resistant to high temperatures and to corrosion. [Ductility is the ability of a material to deform without breaking under tensile stress].

Wires are typically made by drawing or rolling processes both of which can result in work hardening of the alloy. Thermal annealing steps may be used to eliminate such hardening which is responsible for loss of ductility and rupture. However this is not always practicable in view of the chemical nature of the wire. For instance, copper can be drawn through several steps at a given reduction ratio to virtually any wire size without any annealing. However, cast iron even in its annealed condition allows no practical reduction prior to rupture.

In nozzle manufacturing most joints are designed to pre-place the filler material embedded in the joint to allow a visual fillet to form to prove capillary flow through the joint. There are variations of the joint design where the alloy is pre-placed in different locations (eg. above, in the middle, at the base of the joint).

Figure 1:
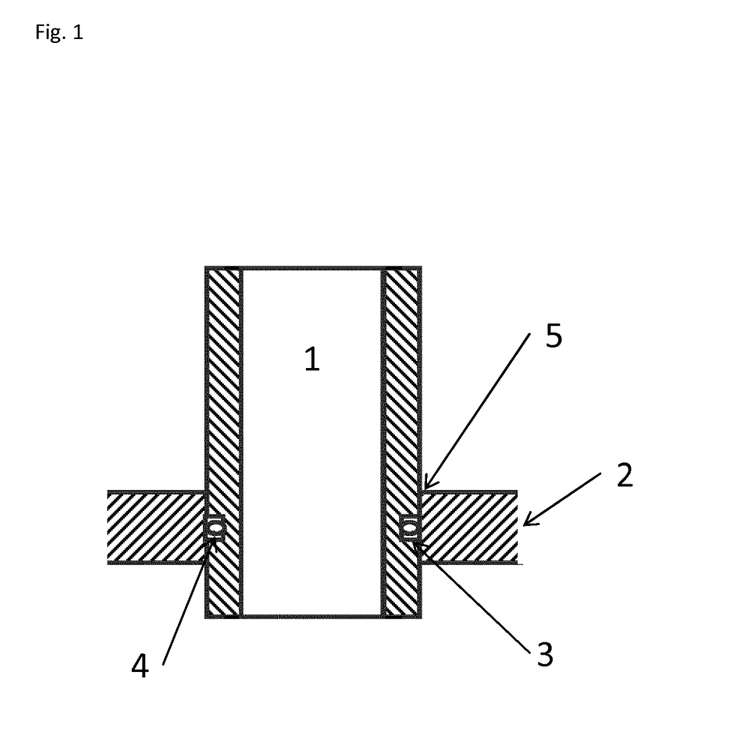
FIG. 1 is a schematic section of a brazed joint between a flange and a notched tube;.

In FIG. 1 a tube 1 is set into a flange 2. The tube 1 has a groove 3 machined to accept a braze ring 4. The braze ring typically needs sufficient flex and memory to snap into the groove. After brazing, along with x-ray, most of the inspection criteria require a visual braze fillet at the junction 5 post braze. This implies that the alloy melted appropriately and that there is correct capillary flow throughout the joint.

Figure 2:
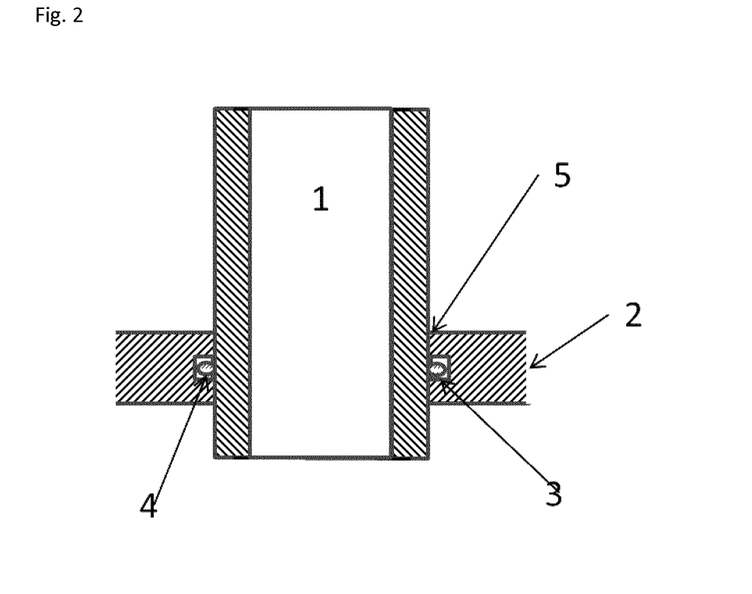
FIG. 2 is a schematic section of a brazed joint between a notched flange and a tube.

In some cases (thin walled tubes) the groove is machined into the flange to accept an OD ring. FIG. 2 shows such a construction where the references have like meaning as in FIG. 1.

In both cases, a brittle braze ring 4 would cause problems in engagement with the groove 3, and would be liable to breakage. It is desirable that the material of the braze ring show sufficient resilience to be put in place without breakage, and such resilience is provided by ductile brazing alloys.

Other brazed joints utilize rings, wires or wire shapes in a similar manner.

Gold containing alloys are typically used in nozzle manufacture because they possess the appropriate ductility, and resistance to high temperature and corrosion; and additionally have high density which allows for X-ray non-destructive testing. Currently used are alloys having high levels of precious metals such as gold or gold and palladium [e.g. Au70/Ni22/Pd8—where the numbers indicate weight percent].

There are other precious metal containing alloy families that are not ductile enough to be formed into wires and are so supplied as pastes [e.g. Au88/Ge12 or Au80/Sn20].

Typically the low ductility is due at least in part to the formation of intermetallic compounds formed from alloy constituents.

Even for alloys with very high gold contents, brittleness can arise depending upon the nature of the other element present. For instance, a Au—Sn alloy will potentially become brittle with a 1% addition of Sn due to the formation of a gold rich intermetallic ($Au_{10}Sn$) phase which consumes a large fraction of the gold (the ductile phase) to form a brittle intermetallic phase.

A paste comprising a powdered brazing alloy is one current option for using such low ductility "brittle" alloys; but is not preferred because the paste can be difficult to apply to the parts to be brazed, and because of inspection requirements for the final brazed product.

There are also "hot rolled" foils and extruded wires in AuSn. These products are brittle and are difficult to work with.

Gold alloys are not the only alloys used in furnace brazing. There are other applications where the optimum chemical composition for the filler metal does not have the desired ductility for the application in question. Other brazing alloy compositions where this may apply include:

Aluminum alloys: used to join brazeable aluminum based metals

Magnesium alloys: used to join magnesium based metals

Copper alloys: brazing of carbon and alloy steels, stainless steel, copper and nickel alloys Silver based alloys: used for joining most ferrous and non-ferrous alloys except aluminum and magnesium Gold based alloys: used for brazing of iron, cobalt and nickel based metals Nickel based alloys: generally used when specification calls for corrosion resistance and high temperature service properties Cobalt based alloys: used to braze cobalt based materials or materials with high Cobalt content

BRIEF SUMMARY OF THE INVENTION

In this specification, reference to "aluminum alloys"; "magnesium alloys" etcetera is meant that the named component [aluminum and magnesium respectively] is present in the alloy in the greatest proportion by weight.

Known methods of making brazing rings of particular low ductility alloys include:

for nickel alloys making a ring of ductile alloy and then diffusing boron into the surface of the alloy to get the final brazing alloy composition;

forming the ring as a sintered product

The problem with the first approach is that the boron rich surface of the alloy may flake off when the ring is bent during application. The problem with the second process is that the ring is brittle in its sintered form, and can break during application.

In welding it is known to use cored wires. U.S. Pat. No. 4,800,131 suggested that such wires were known for welding electrodes to prevent overheating; to allow adjustment of the chemical analysis; to improve purity; or to protect volatile components. U.S. Pat. No. 4,800,131 suggested that such wires may be used in brazing but provided no examples of brazing.

Cored wires have been suggested for use in MIG brazing [JP6226486 and JP6269985]. MIG brazing [metal inert gas] is a process in which an electric arc is formed under an inert atmosphere between a consumable wire electrode and parts to be joined, melting the electrode but not the parts. The reasons given in these documents for using a cored wire include reducing the risk of burn through of the braze and stabilizing the arc.

It is known that brazing with a brazing alloy wire having a low ductility alloy composition is facilitated if the brazing alloy wire is formed from a composite comprising at least one ductile first phase and at least one other phase, the overall composition of the composite being equivalent to the low ductility alloy composition.

For example:

WO2008/079974 discloses a wire-like preform for welding which is produced by repeatedly sintering and breaking up the powder core.

U.S. Pat. No. 2,862,844 discloses a composite brazing material comprising a nickel coating with a core of chromium boride and optionally powdered Colmonoy #6 alloy. All of the phases $Cr_2B$, $Cr_5B_3$, $CrB$, $Cr_3B_4$, $CrB_2$, have melting or decomposition temperatures above 1800° C. However it should be noted that the "chromium boride" mentioned in U.S. Pat. No. 2,862,844 has a melting point of about 1650° C. [3000° F.] consistent with it being at or near a eutectic composition between chromium metal and $Cr_2B$. As a eutectic composition between chromium metal and $Cr_2B$ the chromium boride of U.S. Pat. No. 2,862,844 will contain free chromium metal in its microstructure.

U.S. Pat. No. 2,888,740 discloses production of wire from a ductile sheath with a powder core comprising metals and/or metalloids including boron.

The above mentioned documents either have a relatively rigid core that is repeatedly sintered and broken up [WO2008/079974]; or comprise metals which provide compressibility/deformability/ductility to the particles in the core [U.S. Pat. Nos. 2,862,844, and 2,888,740].

A problem with producing wires from all such materials is that the wire drawing process is aggressive, and the sheath has a tendency to split. Accordingly it is difficult to provide wires with diameters less than about 1 mm.

The applicant has realized that what is required to enable brazing alloys to be drawn satisfactorily into wires, particularly wires with diameters less than 1 mm, is that the core comprises free flowing particles that are discrete and that can flow during the drawing process rather than aggregating to form "lumps" that can impose excessive stress to the wire sheath during the forming process.

One mechanism by which particles may aggregate is by sintering at the temperatures experienced in the wire drawing/annealing process. Sintering may be impeded by providing powders that have a high melting point relative to an annealing temperature of the sheath, for example temperatures of 20%, 30%, 40% or more above the annealing temperature in degrees K of the sheath.

By "annealing temperature of the sheath" is meant a temperature that within a reasonable time, for example less than six hours, preferably three hours or less, will restore ductility to the sheath after work hardening has occurred. A typical temperature-time regime, for annealing non-heat treatable nickel based alloys, is between about 538-815° C. (1000 to 1500° F.) for 0.5 hour up to 3 hrs. A typical temperature-time window for fully restoring ductility is about 704-788° C. (1300-1450° F.) for 2-3 hrs. Annealing temperature is generally defined as the temperature that enables dislocations generated by cold working to annihilate by opposite Burgers vectors cancelling, or merging into grain boundaries or crystal surface. At the microstructural level, exposure of a deformed metal or alloy to elevated temperature causes a sequence of three distinct physical processes: recovery, recrystallization and grain growth. Recovery and crystallization are sufficient for restoring ductility and those processes occur at a temperature about half the melting point of the metal or alloy being deformed.

Sintering may also be impeded by providing powders that have a low proportion of "fines", since fine material sinters more easily than coarse material.

Another mechanism by which powders may aggregate is by compression of powders comprising ductile phases such that the ductile phases are deformed to cause cold welding of the particles. Deformation may be impeded by providing low ductility powders, particularly powders that have a low free metal content such as less than 15%, or less than 10%, or less than 5% or less than 2% or less than 1% or less than 0.5% by volume Yet another mechanism by which powders may aggregate is by interlocking to form a mechanical bond. Interlocking may be impeded by providing powders that approximate spherical in form, having a low aspect ratio such as less than 4:1, or less than 2:1, or less than 3:2.

Interlocking may also be impeded by providing powders that have a relatively smooth surface, for example such as having a convexity of greater than 0.7, preferably greater than 0.8, more preferably greater than 0.9. Convexity is conventionally calculated by calculating a convex hull perimeter for an image of the particle [typically presented by the analogy of an imaginary elastic band encompassing the projection of the particle on to a 2D surface, such is provided by the particle image]; measuring the actual perimeter of the particle; and determining convexity by the formula:

Convexity=convex hull perimeter/actual perimeter

Accordingly, the present invention provides brazing alloy wire, the brazing alloy wire being formed from a composite comprising a sheath of at least one ductile first phase and a core comprising particles of a different composition to the sheath, in which:
  the sheath has an annealing temperature in degrees K
  the particles have a melting point at least 20% above the annealing temperature of the sheath
  the particles have a size distribution in which 25% by weight or less comprise particles less than 25 µm in size
  the particles are discrete
  the overall composition of the composite being equivalent to a low ductility alloy composition.

Further provided are: methods of forming such brazing alloy wires; methods of brazing; and brazed articles; as set out in the appended claims which are hereby incorporated by reference into this description.

By "ductile first phase" is meant a phase of sufficient ductility to permit drawing as a wire to reduction in diameter of 5% or more using conventional wire drawing apparatus. Such a reduction is sufficient to permit at least one practical reduction and following with further reductions by sequentially annealing the material at each reduction step.

A typical conventional drawing process comprises initial reductions of a large [e.g. 25 mm (1.0") diameter rod workpiece on large drawing mills or swaging machines down to a diameter of about 5 mm (0.2"). Further drawing into thinner wire is typically carried out on drawbench, Bull block or stepped-cone multiple-pass type-wire drawing equipment.

By "low ductility alloy composition" is meant a composition of insufficient ductility to permit drawing as a wire to reduction in diameter of 1% or more using such conventional wire drawing apparatus.

BRIEF DESCRIPTION OF THE DRAWINGS

Further features of the invention are apparent from the claims and are exemplified in the following with reference to the drawings in which:

DETAILED DESCRIPTION OF THE INVENTION

The present invention encompasses:
brazing alloy wire formed from a composite comprising a sheath of at least one ductile first phase and a core comprising particles of a different composition to the sheath
the method of drawing a composite comprising a sheath of at least one ductile first phase and a core comprising particles of a different composition to the sheath to form such a brazing alloy wire
a furnace brazing process using such brazing alloy wire
brazed parts formed from such a process.

The particles of a different composition to the sheath may comprise a brittle alloy, element, or compound and may comprise one or more intermetallic compounds.

The brazing alloy wire may be provided in the form of a ring or shape adapted to fit in a groove in one or more of pieces to be brazed.

The furnace brazing may be vacuum brazing.

For furnace brazing, typical wire diameters are 0.010 to 0.040 inch [0.25-1 mm] but sizes outside this range are usable.

The low ductility alloy compositions may be low ductility alloys comprising one or more of the following compositions, which are based on compositions shown as brazing alloys in the AWS Brazing Handbook as being brazing filler metals, but restricted to those alloys that are of low ductility.

The present invention is not restricted to these alloys [which are for example only] and the present invention is predicted to make new alloy compositions feasible.

Typical Alloy Compositions.
Aluminum Based Alloys:
Low ductility alloy compositions comprising:
59.5-97.5% Al
and one or more of
  (0-20)% Si
  (0-10)% Cu
  (0-5)% Mg
  (0-2)% Bi
  (0-1)% Fe
  (0-0.5)% Zn
  (0-0.5)% Mn
  (0-0.5)% Cr
  (0-0.5)% Ti
in which Al+Si+Cu+Mg+Bi+Fe+Zn+Mn+Cr+Ti≥99.5%
balance impurities.
Magnesium Based Alloys:
Low ductility alloy compositions comprising:
67.5-99% Mg
and one or more of
  (0-20)% Al
  (0-5)% Zn
  (0-5)% Mn
  (0-1)% Cu
  (0-1)% Si
in which Mg+Al+Zn+Mn+Cu+Si≥99.5%
balance impurities.
Copper Based Alloys
Low ductility alloy compositions comprising:
43.5-97.6% Cu
and one or more of
  (0-35)% Ag
  (0-10)% P
  (0-10)% Sn
  (0-1)% Si in which Cu+Ag+P+Sn+Si≥99.5%
balance impurities
Low ductility alloy compositions comprising:
≤97.6% Cu
and one or more of
  (0-35)% Ag
  (0-35)% Zn
  (0-20)% Cd
  (0-5)% Ni
  (0-5)% Mn
in which
  Cu≥Ag
  Cu≥Zn; and
  Cu+Ag+Zn+Cd+Ni+Mn≥99.5%
balance impurities
Low ductility alloy compositions comprising:
≤97.6% Cu
and one or more of
  (0-40)% Au
  (0-20)% Ni
  (0-20)% Pd
  (0-20)% Mn
  (0-5)% Ti
in which
  Cu≥Au
  Cu≥Ni
  Cu≥Pd
  Cu≥Mn
  and
  Cu+Au+Ni+Pd+Mn+Ti≥99.5%
balance impurities
Silver Based Alloys:
Low ductility alloy compositions comprising:
≤90% Ag
and one or more of
  (0-35)% Cu
  (0-30)% Zn
  (0-25)% Cd
  (0-15)% Sn
  (0-10)% Mn
  (0-10)% Ni
  (0-1)% Li
in which
  Ag≥Cu
  Ag≥Zn
  Ag≥Cd
  and
  Ag+Cu+Zn+Cd+Sn+Mn+Ni+Li≥99.5%
balance impurities
Low ductility alloy compositions comprising:
90% Ag
and one or more of
  (0-50)% Cu
  (0-25)% Pd
  (0-15)% In
  (0-15)% Sn
  (0-1)% Ni
in which
  Ag≥Cu
  Ag≥Pd
  In+Sn≥2%
  optionally In+Sn≤11%
  and
  Ag+Cu+Pd+In+Sn+Ni≥99.5%
balance impurities Gold Based Alloys:
Low ductility alloy compositions comprising:
≤99% Au
and one or more of
  (0-30)% Ni
  (0-30)% Pd
  (0-20)% Mn
  (0-10)% Cr
  (0-10)% Ag
  (0-5)% B
  (0-5)% Ge
  (0-5)% P
  (0-5)% Si
  (0-5)% Ti
  (0-5)% Y
in which
  Au≥Ni
  Au≥Pd
  Au≥Mn
  B+Ge+P+Si+Ti≥0.5%
  and
  Au+Ni+Pd+Mn+Cr+Ag+B+Ge+P+Si+Ti+Y≥99.5
balance impurities
Low ductility alloy compositions comprising:
≤99% Au
and one or more of
  (0-50)% Cu
  (0-20)% Ag
  (0-20)% Sn
  (0-15)% In
  (0-15)% Ge
in which
  Au≥Cu
  Au>Ag
  Au>Sn
  Sn+In+Ge≥0.5%
  in which Au+Cu+Ag+Sn+In+Ge≥99.5%
balance impurities.
Palladium Based Alloys:
Low ductility alloy compositions comprising:
≤99% Pd
and one or more of
  (0-50)% Co
  (0-25)% Cr
  (0-10)% Si
  (0-5)% W
  (0-5)% Cu
  (0-5)% Fe
  (0-5)% Mo
  (0-5)% Nb
  (0-1)% B
in which
  Pd≥Co
  Pd≥Cr
  Pd≥Si
  Si+B≥0.5%, optionally ≥5%
  Pd+Co+Cr+Si+W+Cu+Fe+Mo+Nb+B≥99.5%
balance impurities.
Low ductility alloy compositions comprising:
≤99% Pd
and one or more of
  (0-50)% Ni
  (0-25)% Cr
  (0-10)% Si
  (0-5)% W
  (0-5)% Cu
  (0-5)% Fe (0-5)% Mo
(0-5)% Nb
(0-1)% B
in which
  Pd≥Ni
  Pd≥Cr
  Pd≥Si
  Si+B≥0.5%, optionally ≥5%
  Pd+Ni+Cr+Si+W+Cu+Fe+Mo+Nb+B≥99.5%
balance impurities.
Nickel Based Alloys:
Low ductility alloy compositions comprising:
≤98% Ni
and one or more of
  (0-40%)% Pd
  (0-30)% Cr
  (0-25)% Mn
  (0-20)% W
  (0-15)% Si
  (0-15)% P
  (0-5)% B
  (0-5)% Cu
  (0-5)% Fe
  (0-5)% Mo
  (0-5)% Nb
in which
  Ni≥Pd
  Ni≥Cr
  Ni≥Mn
  Ni≥W
  Ni≥Si
  Ni≥P
  B+Si+P≥0.5%, optionally ≥5%
  Pd+Ni+Cr+Mn+W+Si+P+B+Cu+Fe+Mo+Nb≥99.5%
balance impurities.
Cobalt Based Alloys:
Low ductility alloy compositions comprising:
≤99% Co
and one or more of
  (0-30)% Cr
  (0-25)% Mn
  (0-20)% W
  (0-15)% Si
  (0-15)% P
  (0-5)% B
  (0-5)% Cu
  (0-5)% Fe
  (0-5)% Mo
  (0-5)% Nb
in which
  Co>Cr
  Co>Mn
  Co>W
  Co>Si
  Co>P
  B+Si+P≥0.5%, optionally ≥5%
  Co+Cr+Mn+W+Si+P+B+Cu+Fe+Mo+Nb≥99.5%
balance impurities.
The following are typical examples of the invention.

EXAMPLE 1

As mentioned above, a Au—Sn alloy will potentially become brittle with a 1% addition of Sn due to the formation of a gold rich intermetallic (Au10Sn) phase which consumes a large fraction of the gold (the ductile phase) to form the brittle intermetallic phase.

A typical gold-tin alloy might have a composition of 85 wt % Au 15 wt. % Sn and would not be ductile enough to be formed into a wire. For this Au—Sn alloy an intermetallic powder may be produced [for example an $AuSn_2$ intermetallic] and combined with a gold rich ductile material to produce a composite of the intermetallic and the ductile phase.

For example the $AuSn_2$ intermetallic is encapsulated into an Au sheath in proportions to produce a composite having the overall 85 wt % Au 15 wt. % Sn composition. This composite may then be drawn using any conventional method and apparatus to produce 85 wt % Au 15 wt. % Sn wires. The Au will be the predominant phase and hence maintain sufficient ductility for the forming process.

EXAMPLE 2

Consider a Au92-Sn8 wt. % alloy.

Under equilibrium conditions of slow solidification encountered in conventional gravity casting, the solidified as-cast alloy will consist of a solid solution of Sn in Au (α) containing about 2 wt. % Sn and an intermetallic compound $Au_5Sn$ (ξ).

Even though Sn distribution is expected to be rather uniform within the alloy material, the relative volume fractions of the two components (see $2^{nd}$ line of Table 1) are such that the alloy will be inherently brittle.

A possible solution for obtaining a ductile material would be designing a cored structure in which a Sn powder is cored into an Au sheath for subsequent wire drawing operations. It is anticipated that such structures will produce a workable product, but perhaps one with a non-uniform distribution of Sn given the low volume fraction of Sn (see $3^{rd}$ line of Table 1).

Alternatively, one can design a two component alloy such that both good Sn distribution and improved ductility can be accomplished. For this particular case, a cored structure consisting of a soft Au sheath and an equiatomic compound of Au and Sn such as the intermetallic AuSn (δ) is anticipated to produce a relatively ductile feedstock for subsequent drawing operation with a substantially improved distribution of Sn based on the relative volume fraction of the two compounds (see $4^{th}$ line of Table 1)

TABLE 1

| Volume fractions of material structure constituents | | | | | |
| --- | --- | --- | --- | --- | --- |
| Structure | $f_v^\alpha$ | $f_v^{\xi'}$ | $f_v^{Sn}$ | $f_v^{Au}$ | $f_v^\delta$ |
| As-cast (α/ξ') | 29% | 71% | / | / | / |
| Structured (Au/Sn) | / | / | 12% | 88% | / |
| Structured (Au/δ) | / | / | / | 69% | 31% |

As can be seen, in both cases shown as the $3^{rd}$ and $4^{th}$ lines of Table 1, the ductile component Au predominates. Composite products of such composition should be sufficiently ductile to be worked into a wire.

EXAMPLE 3

For applications such as nozzles for industrial gas turbines, typically Au70/Ni22/Pd 8 alloys are used as having suitable ductility.

The present invention would allow low gold, or even no gold, low ductility alloys to be used, for example Ni57.1/Pd30/Cr10.5/82.4. Such an alloy could, for example, be produced as a composite of a Pd/Ni rich phase for ductility with the Cr and B in a low ductility phase. For a given composition, different mixtures of low ductility and ductile phases may be used, as has been demonstrated above for Au—Sn alloys.

For similar compositions, with lower Cr content, a Pd/Cr rich phase could form the ductile phase, with a NiB brittle intermetallic phase forming the low ductility phase.

The present invention is not restricted to the above alloys, which are merely representative of the sort of low ductility composition to which this invention may be applied.

Manufacturing Methods

The following disclose specific exemplary methods of making cored wires, but is not restricted thereto.

A cored wire of up to 0.063" diameter can be produced by the means of roll forming equipment or the same. This equipment folds at room temperature a strip of ductile alloy component to form a sheath that encapsulates the brittle powder component or a ductile powder component that has a high propensity to react with the other component (such as in the case of Au—Sn) to form a brittle alloy.

Further wire size reductions can be accomplished with previously cited wire drawing equipment.

Alternatively, the core powder constituent can be encapsulated in a container (which may be cylindrical) consisting of the drawable ductile material, evacuated at room temperature and sealed to provide a larger feedstock workpiece for swaging or drawing mill operations and further wire drawing processing.

Figure 3:
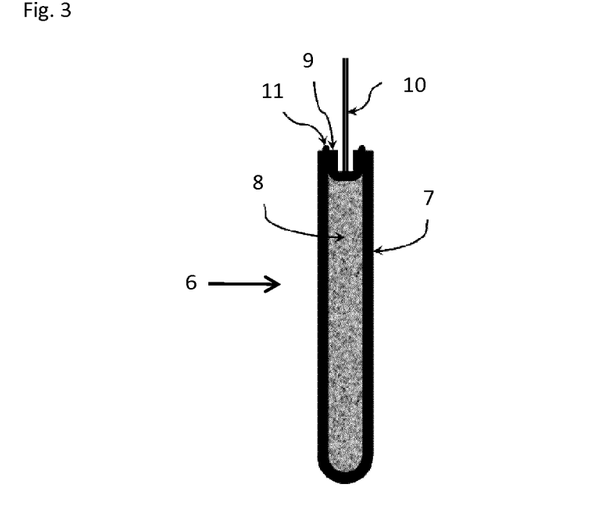
FIG. 3 is a schematic section of a preform for reduction in diameter to produce a brazing wire to the invention.

For example, as shown in FIG. 3, a starting preform 6 comprising a ductile sheath 7 may consist of a tube open at one end and filled with a core powder material 8 constituent of the brazing alloy. Complete encapsulation of the powder is accomplished with a plug 9 comprising an exit stem tube 10 joined with the sheath by means of a weld or a brazed joint to form a vacuum tight seal 11.

The alloy composition and wall thickness of the sheath component are determined by the composition and the packing density of the core powder component as exemplified below. The sheath can be made by any suitable method. For example, a wrought cast bar may be prepared by vacuum induction melting of a charge of alloy elements weighed to meet the nominal composition of the sheath. For instance, a Ni—Pd—Cr melt charge may comprise electrolytic nickel pieces, palladium shots and chromium flake of 99.95% purity or higher. Melting may be performed in a zirconia or alumina crucible, although zirconia is a preferred (but not essential) refractory material for melting chromium containing alloys.

The sheath inner channel may be formed by gun drilling or alternatively by sink electric discharge machining (EDM); however the first method is preferable for higher recovery of precious metal containing chips.

Figure 4:
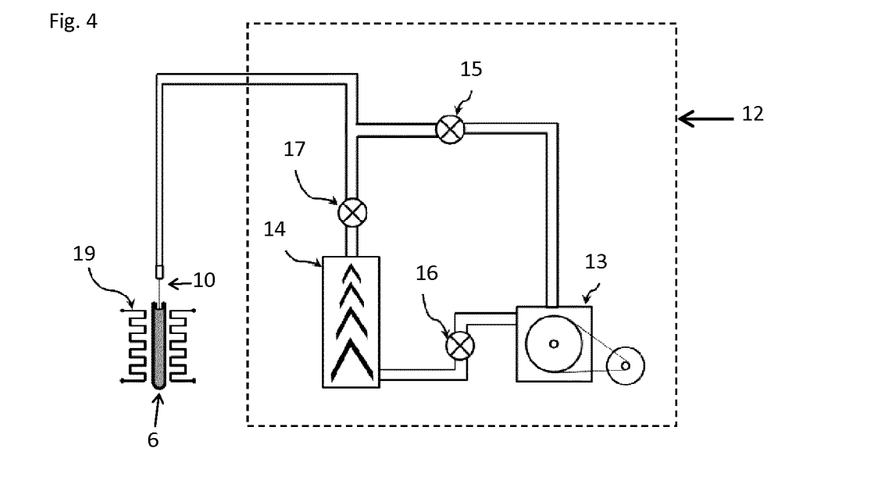
FIG. 4 shows schematically an apparatus for degassing a core powder component in the preform of FIG. 3.

FIG. 4 shows an apparatus for degassing the core powder component in the sheath. Without degassing, adsorbed gases on powder particles surface may evolve upon processing into blisters that could adversely affect the integrity of the consolidated powder body. Degassing while the powder is in the sheath reduces the risk of re-adsorption of gases onto the powder. Degassing comprises heating the powder while under an appropriate vacuum.

As shown in FIG. 4, the starting preform 6 is connected via the exit stem tube 10 to a vacuum apparatus 12. The vacuum apparatus 12 may comprise a mechanical pump 13, diffusion pump 14, and with appropriate valves [roughing valve 15, backing valve 16, and high vacuum valve 17] to permit control of the vacuum. Both a mechanical pump and diffusion pump are shown, but for some materials a mechanical pump alone may provide sufficient vacuum.

The preform 6 is housed in a heater 19, which may be of any type appropriate to provide the desired degassing temperature.

The application of heat to the capsule is aimed at accelerating the degassing operation and forcing desorption of gas species. Typically, heating to 0300-600° C. range is desirable to thermally activate the desorption process. Typically evacuation of the encapsulated powder is carried out until a suitable vacuum is reached [e.g. 1.3 Pa (about 0.01 torr) at a leak rate of no more than 13 Pa (about 0.1 torr) per minute]. At this point the degassing process is typically complete and the stem tube may be crimped to keep the encapsulated powder under vacuum. [A like degassing procedure can be applied to manufacture of composite wires as described above].

Figure 5:
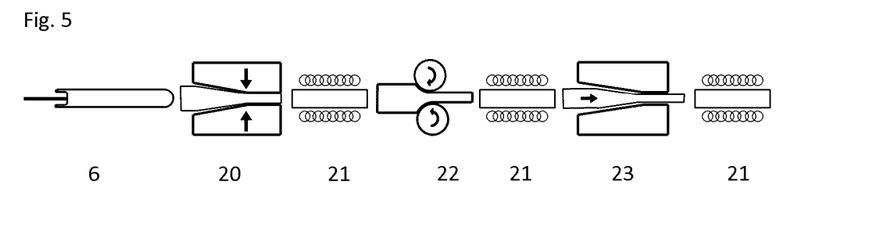
FIG. 5 shows schematically steps of a wire forming process that may be used to reduce the preform of FIG. 3 into a wire.

FIG. 5 shows schematically the steps of a wire forming process that may be used to reduce the sealed preform 6 into a wire of less than 1 mm diameter size. First reductions of the preform by 22% of area size are accomplished by swaging 20. The radial compression associated with swaging process helps in preventing damage to the vacuum seal 11 and promotes optimal packing and homogeneous distribution of the powder component within the sheath 7. Swaging dies of incrementally decreasing sizes are used for each reduction at a given die size.

Annealing 21 can be either performed after completion of the forming process step or at any given stage during forming depending on the rate of strain hardening of the sheath material. Excessive strain hardening reduces formability of the material and may cause premature rupture of the sheath 7. Annealing is preferably conducted for sufficient time at a temperature at which full recovery from imparted cold work in the sheath material is achieved.

Further reduction steps may be accomplished by roll drawing 22. In this process, the wire is drawn between two rolls within a groove of the desired size. The forming stress is predominantly compressive with a minor tensile component. This stress condition prevents tearing of wall of the sheath 7 and promotes homogeneous flow of the powder which in turn prevents necking of the wire. This step may account for a 40% area reduction.

A further area reduction [e.g. 38%] may be carried out on a deep drawing bench 23. As the deformation mechanism in deep drawing proceeds essentially by axial tension, care needs to be exercised not to stretch the sheath 7 beyond its rupture strength. In general it is recommended to proceed with small deformations and die size reduction increments while performing stress relieving anneals more often. Due to the higher risk of wire rupture encountered in deep drawing, this process is usually performed with sufficient lubrication with commercially available lubricants, for example those consisting of water soluble sodium sulfonates mixed with fatty oils.

The invention is not limited to the specific steps and specific order shown schematically in FIG. 5 but encompasses any method of reducing a preform down to the brazing alloy wire of the present invention. Like steps may be performed on homogeneous composite wires as on cored wires.

PROSPECTIVE EXAMPLE 4

The applicants believe the alloy of Example 3 (Ni57.1-Pd30.0-Cr10.5-B2.4) wt. % can be produced as a 1 mm (0.04") or less cored wire by the above described methods.

The powder component used would be $CrB_2$, chromium diboride, which is readily available and can be found in purities of 99.9% or higher. However, the particles of commercially available $CrB_2$, tend to be rough and jagged in form, resulting in particle agglomeration during the drawing process leading to rupture of the sheath. To reduce the risk of this happening, the $CrB_2$ may be spheroidized, for example spheroidized by plasma spraying either as particles or agglomerates of particles, to form more rounded particles. The particles should be selected to have a size distribution in which 25% by weight or less comprise particles less than 25 μm in size. Preferably less than 5% by weight comprises particles less than 20 μm in size.

Spheroidization by plasma spraying is a process in which the particles are injected into a plasma and undergo in-flight heating and melting [in whole or in part] followed by cooling and solidification. The particles produced by this process tend to be spherical or rounded in form.

Other methods of producing spherical or rounded particles can be used [e.g. gas atomization]. An appropriate alloy composition for the sheath was calculated as Ni62.18-Pd32.67-Cr5.15 wt. %.

A measured packing density for $CrB_2$ powder was 2.76 g/cm³, which yielded a wall thickness of 7.34 mm (0.289") for a sheath external diameter of 28.58 mm (1.125").

The calculation for this example was as follows. Similar calculations apply to other examples and compositions.

Calculation of Required Sheath Alloy Composition

|  | Ni | Pd | Cr | B |
|---|---|---|---|---|
| Desired composition | 57.1 | 30 | 10.5 | 2.4 |
| Amount contributed by $CrB_2$ |  |  | 5.77 | 2.4 |
| Balance required in sheath | 57.1 | 30 | 4.73 | 0 |
| Alloy composition of sheath (normalised to 100%) | 62.18 | 32.67 | 5.15 | 0 |

Calculation of Sheath Thickness

Figure 6:
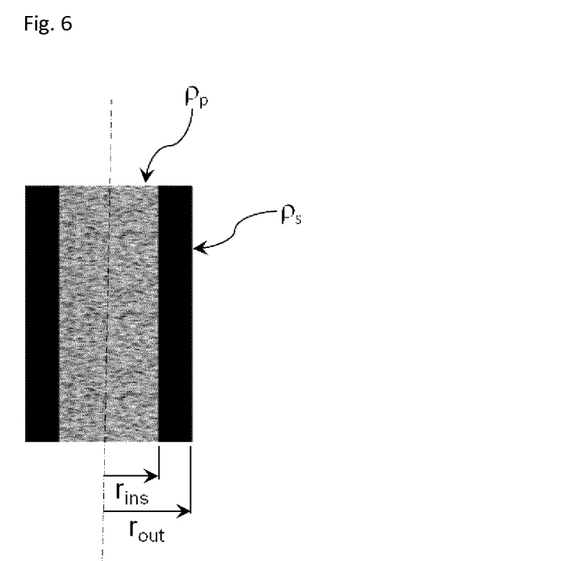
FIG. 6 shows schematically a section of a preform for use in preparing a cored wire.

FIG. 6 shows a section of a cylindrical tubular preform comprising a sheath having an inside radius $r_{ins}$ and outside radius $r_{out}$.

The weight of sheath per unit length $w_s$ is given by:

$$w_s = \pi(r_{out}^2 - r_{ins}^2)\rho_s$$

where $\rho_s$ is the theoretical density of the sheath material.

The weight of powder constituent per unit length $w_p$ is given by:

$$w_p = \pi r_{ins}^2 \rho_p$$

where $\rho_p$ is the packing density of the sheath material

The ratio of the weight of sheath per unit length to the weight of powder constituent per unit length is the same as the ratio of the weight fraction of sheath constituent $f^s_w$ to the weight fraction of powder constituent $f^p_w$ $$\frac{w_s}{w_p} = \frac{\pi(r_{out}^2 - r_{ins}^2)\rho_s}{\pi r_{ins}^2 \rho_p} = \frac{f^s_w}{f^p_w}$$

Which can be solved to determine the inside radius $r_{ins}$ required to obtain desired weight fractions of the core and the sheath $$r_{ins} = \sqrt{\frac{f^p_w \rho_s}{f^s_w \rho_p + f^p_w \rho_s}} \, r_{out}.$$

EXAMPLE 4a

It was found that when making such a composition with a 26.52 mm (1.044") outer diameter sheath of wall thickness 6.096 mm (0.24") comprising 63.5 wt % Ni and 34.5 wt % Pd and with a filling comprising plasma spherodized Cr-18.9B wt. % powder, problems arose with cracking of the sheath is despite the thick sheath wall permitted by this formulation. This was attributed to suspected formation of an ordered phase in the sheath rather than a continuous (Ni,Pd) solid solution. For this reason, for such compositions, and where the sheath comprises predominantly Ni and Pd, the amount of Pd should preferably be at least 30 at % (for pure Ni—Pd equivalent to 43.7 wt %).

PROSPECTIVE EXAMPLE 5

The applicants believe an alloy comprising (Ni50.0-Pd36.0-Cr10.5-83.0-Si0.5) wt. % may be produced as a 1 mm (0.04") or less cored wire by the above described methods.

The powder component used in this example would be a blend of 91.4 wt % $CrB_2$ chromium diboride and 8.6 wt % $CrSi_2$ chromium disilicide, both readily available and which can be found in purities of 99.9% or higher. As with Example 4, the particles of the powder should be selected to have a size distribution in which 25% by weight or less comprise particles less than 25 μm in size, preferably comprising less than 5% by weight of particles less than 20 μm in size, and may be spheroidized if too jagged in form.

The calculated alloy composition for the sheath was determined to be Ni56.29-Pd40.53-Cr3.18 wt. %.

The measured packing density for $CrB_2$ and $CrSi_2$ powder blend was 2.75 g/cm³, which yields a wall thickness of 6.32 mm (0.249") at for a sheath external diameter of 28.58 mm (1.125").

EXAMPLE 6

An alternative alloy comprising (Ni50.0-Pd36.0-Cr10.5-83.0-Si0.5) wt. % (same composition as Example 5) was produced as a 0.889 mm (0.037") cored wire by the above described methods.

The powder component used in this example is a gas atomized Ni46.26-Cr40.30-1311.52-Si1.92 wt. % powder prepared with electrolytic nickel pieces, and chromium flake of 99.95% purity or higher.

Boron melt stock is supplied in pellets 95% pure in which most impurities are volatile elements that were readily eliminated during vacuum induction melting prior to atomization. Silicon was supplied in high purity lump form. The resulting purity of the gas atomized powder was about 99.97%. The powder produced was a −100 mesh powder [90% by weight having a particle size less than 149 μm] which was highly spherical with a small fraction of fine particles (particles less than 25 μm constituting less than 25% by weight). It has a liquidus temperature of about 1788° C. (3250° F.).

The calculated alloy composition for the sheath was determined to be Ni51.32-Pd48.68 wt. %.

Measured packing density for the gas atomized Ni46.26-Cr40.30-1311.52-Si1.92 wt. % powder was 6.21 g/cm³, which yields a wall thickness of 4.13 mm (0.1625") at for a sheath external diameter of 28.58 mm (1.125").

Stress relief anneals were conducted at about 788° C. (1450° F.) to soften the sheath between the reduction steps in the wire drawing process. No evidence was found of sintering of the core.

Based on the stress relief temperature that was found to be effective for softening the Ni—Pd—(Cr) sheath compositions of Examples 4 and 5, all Ni—Cr—B powder compositions having a liquidus temperature equal to or higher than about 1593° C. (2900° F.) should not sinter. These compositions include, for example:
a. Ni—B (0≤Ni≤30 at. %)
b. Cr—B (0≤Cr≤82 at. %)
c. Ni—Cr—B (45≤B≤70 at. %; 0≤Cr≤10 at. %; 30≤Ni≤45 at. %)
d. Ni—Cr—B (18≤B≤45 at. %; 10≤Cr≤82 at. %; 0≤Ni≤45 at. %)

EXAMPLE 6a

An alloy of the same composition as Examples 5 and 6 was produced as a 0.762 mm (0.030") cored wire by the above described methods using a 28.58 mm (1.125") outer diameter sheath having a 4.06 mm (0.16") thick wall comprising 51.5 wt % Pd and 48.5% nickel filled with 100 mesh gas atomized powder of composition in wt % Ni 46.2%, Cr 40.4%, B 11.5%, Si 1.9%.

PROSPECTIVE EXAMPLE 7

Many other cored wire alloy designs are possible and not limited to the examples listed in this disclosure. In particular, one preferred alternative would be to use a nickel bar of the required purity (99.9% or higher) and formulate a single pre-alloyed powder or a blend of alloy powders of suitable composition to obtain the desired alloy for the cored wire. This approach minimizes the amount of loss of other elements in the drilling process, which is particularly important when the overall alloy composition comprises precious metals.

EXAMPLE 8

A 6.35 mm (0.25") outer diameter 0.89 mm(0.035") thick wall nickel tube filled with a Ni—Cr—B—Si high melting temperature alloy gas atomized powder was drawn through a single swagger pass and a sequence of deep drawing steps with alternating anneals at 1350° C. down to 0.76 mm (0.030") wire diameter size. This can enable the manufacture of brittle alloys wires such as:
Icronibsi™-7 [nominal composition by weight: 7.0% Cr, 4.5% Si, 3.2% B, 3.0% Fe, balance Ni];
Nibsi®-4 [nominal composition by weight: 4.5% Si, 3.2% B, balance Ni],
Nibco™-4, [nominal composition by weight: 20.0% Co, 4.0% Si, 2.7% B, balance Ni]
Nibsi®-M, [nominal composition by weight: 5.6% Si, 1.6% B, balance Ni]
Icronibsi®-14 [nominal composition by weight: Cr 14.0%, Si 4.5%, B 3.2%, Fe 4.5%, balance Ni]; and
Nicro™-B [nominal composition by weight: Cr 15.0%, 4% B, balance Ni].

As mentioned above, the present invention requires that the particles have a size distribution in which 25% by weight or less comprise particles less than 25 μm in size, preferably comprising less than 5% by weight of particles less than 20um in size. It is of course required that the particles are not so large as to disrupt the formation of the wire. Accordingly it is required that the core powder does not comprise particles greater than 75% the diameter of the wire, preferably less than 50% the diameter of the wire. Typically an upper bound for the particles is 300 μm [e.g. −50 mesh (about 297 μm)] with smaller upper limits [e.g <250 μm, <200 μm, <150 μm] being preferred.

Forming Shapes

The wires can be bent to shape [e.g. rings] using conventional methods and if necessary annealed before use.

By the methods disclosed resilient wires and shapes can be formed of brazing alloys that conventionally would lack required resilience. The person skilled in the art will readily see variants of the invention described, and all such variants are intended to be covered by the invention.

The invention claimed is:
1. A brazing alloy wire formed from a composite comprising a sheath of at least one ductile first phase and a core comprising particles of a different composition to the sheath, wherein
    the sheath has an annealing temperature in degrees K;
    the particles have a melting point at least 20% above the annealing temperature of the sheath;
    the particles have a size distribution in which 25% by weight or less comprise particles less than 25 μm in size and the particles are capable of flowing during a drawing process;
    the particles are discrete;
    the particles have a free metal content of less than 10% by volume; and
    the overall composition of the composite is equivalent to a low ductility alloy composition.
2. The brazing alloy wire as claimed in claim 1, in which the particles have an aspect ratio of less than 4:1.
3. The brazing alloy wire as claimed in claim 2, in which the particles have an aspect ratio of less than 2:1.
4. The brazing alloy wire as claimed in claim 3, in which the particles have an aspect ratio of less than 3:2.
5. The brazing alloy wire as claimed in claim 1, in which the particles have a melting point at least 30% above the annealing temperature of the sheath.
6. The brazing alloy wire as claimed in claim 5, in which the particles have a melting point at least 40% above the annealing temperature of the sheath.
7. The brazing alloy wire as claimed in claim 1, in which the particles have a free metal content of less than 5% by volume.
8. The brazing alloy wire as claimed in claim 1, in which the particles have a convexity greater than 0.7.
9. The brazing alloy wire as claimed in claim 8, in which the particles have a convexity greater than 0.8.
10. The brazing alloy wire as claimed in claim 9, in which the particles have a convexity greater than 0.9.
11. The brazing alloy wire as claimed in claim 1, in which the low ductility composition is an alloy selected from the group comprising aluminum based alloys, magnesium based alloys, copper based alloys, silver based alloys, gold based alloys, palladium based alloys, nickel based alloys, and cobalt based alloys.
12. The brazing alloy wire as claimed in claim 1 in which the brazing alloy wire is an annealed wire.
13. The brazing alloy wire as claimed in claim 1, in which the wire is in the form of a ring.
14. The brazing alloy wire as claimed in claim 1, in which the wire has a diameter of less than 1 mm.
15. The brazing alloy wire as claimed in claim 14, in which the wire has a diameter of less than 0.5 mm.
16. The brazing alloy wire as claimed in claim 15, in which the wire has a diameter of less than 0.25 mm.
17. A method, for forming a brazing alloy wire as claimed in claim 1 comprising:

a) providing a preform of a composite comprising a sheath of the at least one ductile first phase and a core comprising particles of a different composition to the sheath, wherein the sheath has an annealing temperature in degrees K;

the particles have a melting point at least 20% above the annealing temperature of the sheath;

the particles have a size distribution in which 25% by weight or less comprise particles less than 25 μm in size and the particles are capable of flowing during a drawing process:

the particles are discrete;

the particles have a free metal content of less than 10% by volume: and the overall composition of the composite is equivalent to a low ductility alloy composition; and b) in two or more reduction steps, reducing the preform in diameter while increasing the length of the preform to form the wire;

and in which one or more annealing steps are provided between the two or more reduction steps to restore ductility to the sheath.

18. The method as claimed in claim 17, in which the two or more reduction steps comprise one or more swaging steps.

19. The method as claimed in claim 17, in which the two or more reduction steps comprises one or more roll drawing steps.

20. The method as claimed in claim 17, in which the two or more reduction steps comprises one or more deep drawing steps.

21. The method as claimed in claim 17, in which the two or more reduction steps comprises a combination of two or more different reduction steps selected from the group swaging, roll drawing and deep drawing.

22. The method as claimed in claim 17, in which the material of the preform is degassed prior to the one or more reduction steps.

23. The method as claimed in claim 17, in which the one or more ductile first phases are present in proportions sufficient to permit drawing of the composite to a reduction in diameter of 5% or more.

24. The method of furnace brazing comprising joining parts to form an article, wherein the brazing employs the wire as claimed in claim 1.

25. The brazing alloy wire as claimed in claim 1, wherein the overall composition of the composite is equivalent to a low ductility alloy composition selected from the group: aluminium based alloys, magnesium based alloys, silver based alloys, gold based alloys, palladium based alloys, nickel based alloys, and cobalt based alloys.

26. The brazing alloy wire as claimed in claim 1, wherein the overall composition of the composite is equivalent to a low ductility alloy composition comprising:

≤97.6% Cu and one or more of (0-35)% Ag (0-35)% Zn (0-20)% Cd (0-5)% Ni (0-5)% Mn in which Cu≥Ag Cu≥Zn; and Cu+Ag+Zn+Cd+Ni+Mn≥99.5% balance impurities.

27. The brazing alloy wire as claimed in claim 1, wherein the overall composition of the composite is equivalent to a low ductility alloy composition comprising:

≤97.6% Cu and one or more of (0-40)% Au (0-20)% Ni (0-20)% Pd (0-20)% Mn (0-5)%Ti in which Cu≥Au Cu≥Ni Cu≥Pd Cu≥Mn and Cu+Au+Ni+Pd+Mn+Ti≥99.5% balance impurities.

28. A brazing alloy wire formed from a composite comprising a sheath of at least one ductile first phase and a core comprising particles of a different composition to the sheath, wherein the sheath has an annealing temperature in degrees K;

the particles have a melting point at least 20% above the annealing temperature of the sheath;

the particles have a size distribution in which 25% by weight or less comprise particles less than 25 μm in size and the particles are capable of flowing during a drawing process;

the particles are discrete;

wherein the overall composition of the composite is equivalent to a low ductility alloy composition, wherein the wire has a diameter of less than 1 mm.

29. A brazing alloy wire formed from a composite comprising a sheath of at least one ductile first phase and a core comprising particles of a different composition to the sheath, wherein the sheath has an annealing temperature in degrees K;

the particles have a melting point at least 20% above the annealing temperature of the sheath;

the particles have a size distribution in which 25% by weight or less comprise particles less than 25 μm in size and the particles are capable of flowing during a drawing process;

the particles are discrete;

wherein the overall composition of the composite is equivalent to a low ductility alloy composition, wherein the wire is a longitudinally seamless wire.

* * * * *